Figure 1:
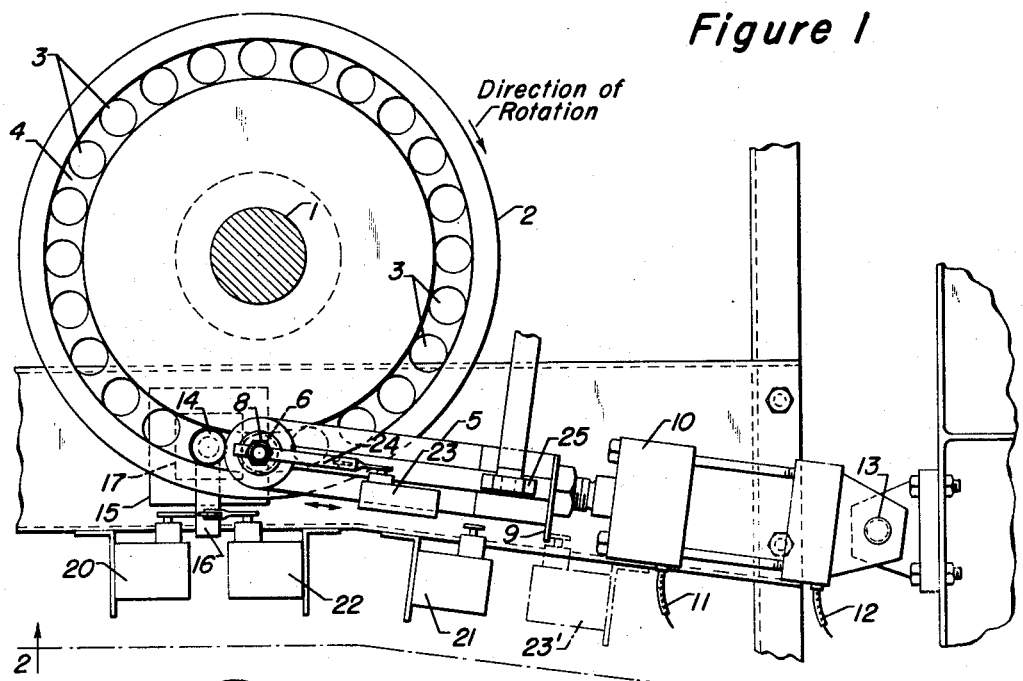

Aug. 9, 1960  F. V. PURSE ET AL  2,948,166
ROTARY DRIVE MECHANISM

Filed June 22, 1959  3 Sheets-Sheet 1

INVENTORS:
Frank V. Purse
Edward A. Young

BY: Chester J. Giuliani
Philip J. Liggett
ATTORNEYS

Aug. 9, 1960

F. V. PURSE ET AL 2,948,166

ROTARY DRIVE MECHANISM

Filed June 22, 1959

INVENTORS:
Frank V. Purse
Edward A. Young

BY: Chester J. Giuliani
Philip F. Liggett
ATTORNEYS

Aug. 9, 1960   F. V. PURSE ET AL   2,948,166
ROTARY DRIVE MECHANISM
Filed June 22, 1959   3 Sheets-Sheet 3

INVENTORS:
Frank V. Purse
Edward A. Young

BY: Chester J. Giuliani
Philip T. Liggett
ATTORNEYS

United States Patent Office 2,948,166
Patented Aug. 9, 1960

2,948,166

ROTARY DRIVE MECHANISM

Frank V. Purse, Skokie, and Edward A. Young, Des Plaines, Ill., assignors to Universal Oil Products Company, Des Plaines, Ill., a corporation of Delaware Filed June 22, 1959, Ser. No. 821,782

7 Claims. (Cl. 74—822)

This invention relates to a rotary drive means and more particularly it concerns a rotary drive mechanism for effecting incremental, unidirectional rotation of one or more mechanical elements having relatively high frictional load characteristics and which must be positioned with high precision.

Many commercial flow processes involve the use of rotary multiport fluid distributing valves whereby continuous or semi-continuous rearrangement of the various flow paths internal to the process may be periodically accomplished. Such processes include, but are not limited to, selective adsorption processes, cyclic reaction-regeneration processes, water softening and treating units, and other fluid-solid contacting processes. The utility and applicability of rotary distributing valves is widely recognized and need be described only briefly here; the principal advantages to be derived from their use include the elimination of complex manifolds of individual two-way valves, the positive phase relationship established as between the various streams to be transferred, and the simultaneity of the stream transfer itself.

A great many fluid-solid contacting processes, particularly those in which the solid must be successively contacted with different fluids or subjected to varying process conditions, are most advantageously carried out when the solid is circulated in a closed path through a number of reaction or separation zones and maintained as a gravitating or fluidizing bed. In a number of such processes, however, it is impractical or impossible to establish a moving bed type of operation, as for example, when the solid is a fragile catalyst easily destroyed by attrition, or too dense to undergo fluidization, or highly abrasive to the process conduits and other equipment. In these cases, a simulated moving bed process may be obtained by disposing the solid, particulate contacting material in the form of a fixed, elongated bed or series of beds which are contained in one or more suitable vessels and are connected to form a closed flow path, maintaining a continuous circulating flow therethrough, successively passing different fluid streams alternately into and out of each of many small but discrete portions of the bed and simultaneously advancing the points of entry and exit of the various streams along the longitudinal axis of the beds at fixed time intervals. The simplest and most effective method of transferring the streams is by means of a suitable multiport distributing valve which, in general, may be either of the rotary plug type or the rotary disc type. A typical rotary distributing valve for this purpose may have a plurality of circumferentially spaced, peripheral ports in the valve body, each of which is connected by conduit means to one of the stream entry-exit points in the contacting vessel. The valve plug or disc member contains separate fluid passageways corresponding in number to the number of process streams being introduced to, and withdrawn from, the contacting bed. The passageways are in individual continuous communication with various process supply and withdrawal conduits through secondary body ports and are in discontinuous communication with each of the peripheral body ports as the plug member is rotated through 360°. When the plug is advanced from one adjusted position to the next, the points of entry and exit of the various streams are correspondingly shifted, and through repeated revolutions of the plug, a continuous-cyclic contacting process is approximated. As the number of peripheral ports is increased, the more closely does the approximation approach a continuous process. In many cases, depending upon the nature of the specific process, the solid-fluid equilibria, and conditions of flow, temperature and pressure, the valve rotation rate is itself a critical process variable and must be controlled to accommodate changing conditions. The valve rotation rate, in the sense used herein, refers to the length of time the plug or disc resides in each adjusted position; the shorter the residence time, the faster the rotation rate. It is always desirable that the transition time, that is, the time required to move the valve from one adjusted position to the next, be kept as short as possible.

The use of a rotary distributing valve of the class described presents a number of problems in connection with its rotation. In any valve, and especially in distributing valves having a large number of ports and passageways, it is important to minimize interport leakage, which is generally accomplished by precise machining of the valve seating surfaces and imposing a relatively large seating force on the seating surface by means of adjustable compression members, springs, or pressurized chambers. Much of the prior art has been concerned with the development of specially contoured seating surfaces, deformable seat inserts, anti-friction bearing surfaces, automatic unseating mechanisms and other ingenious devices aimed at reducing the required seating force or the frictional component thereof without increasing interport leakage. While these unique devices have been more or less successful, the fact remains that it is still necessary to provide seating forces of considerable magnitude, and a correspondingly large frictional force must be overcome in order to rotate the valve plug. With any but the smallest distributing valves, manual operation is out of the question and suitable power operators must be employed, as will certainly be the case when the valve is used in a fully automated, commercial process unit. Where the rotary valve has only a few, perhaps 3 or 4, adjusted positions, a conventional ratchet-and-pawl rotary drive mechanism powered by pneumatic or hydraulic pistons is commonly used, since precise positioning of the valve plug is unnecessary and considerable mechanical hysteresis may be tolerated. However, where the rotary valve has a large number of adjusted positions, each corresponding to one of the aforesaid peripheral ports, accurate positioning of the valve plug becomes of paramount importance, since, the physical size of the valve being limited to the minimum consistent with accepted design practice, the circumferential distance between adjacent peripheral ports is necessarily reduced. Conventional ratchet or gear driving means have been found unsatisfactory for the latter application because backlash, lost motion, slippage and other inherent defects thereof make them too unreliable for an application of this nature calling for continuous operation, high torque, and precise angular positioning of the driven member.

It is, therefore, a principal object of this invention to provide apparatus for rotating, incrementally and unidirectionally, a rotatable load having a large frictional counter-torque.

It is another object of this invention to provide a rotary drive mechanism for rotating a highly frictional load successively through a plurality of closely spaced rest positions.

Still another object of this invention is to provide a rotary drive device which comprises restraining means for locking the rotatable member in each of its adjusted positions.

It is a further object of this invention to provide a rotary drive mechanism operated in conjunction with an adjustable time delay means whereby the period of rotation may be controlled.

These and other objects of this invention will be apparent from the accompanying specification and drawings.

In one of its embodiments this invention concerns a rotary drive mechanism comprising a rotatable member, a reciprocable driving member, a disengageable connection means carried by said driving member connecting the latter with said rotatable member whereby said driving member in one direction of movement thereof is pivotally engaged with the rotatable member effecting rotation of the latter through a predetermined angle and in the other direction of movement thereof is disengaged from the rotatable member, a reciprocable locking member positioned adjacent said rotatable member, said locking member in one of its extended positions engaging with and restraining the rotatable member from movement while disengaging said connection means from said rotatable member and in the other of its extended positions being disengaged from said rotatable member and permitting unimpeded rotation of the latter, and interlocking control means connecting with both said driving member and said locking member and actuating the alternate movement of said members.

Figure 2:
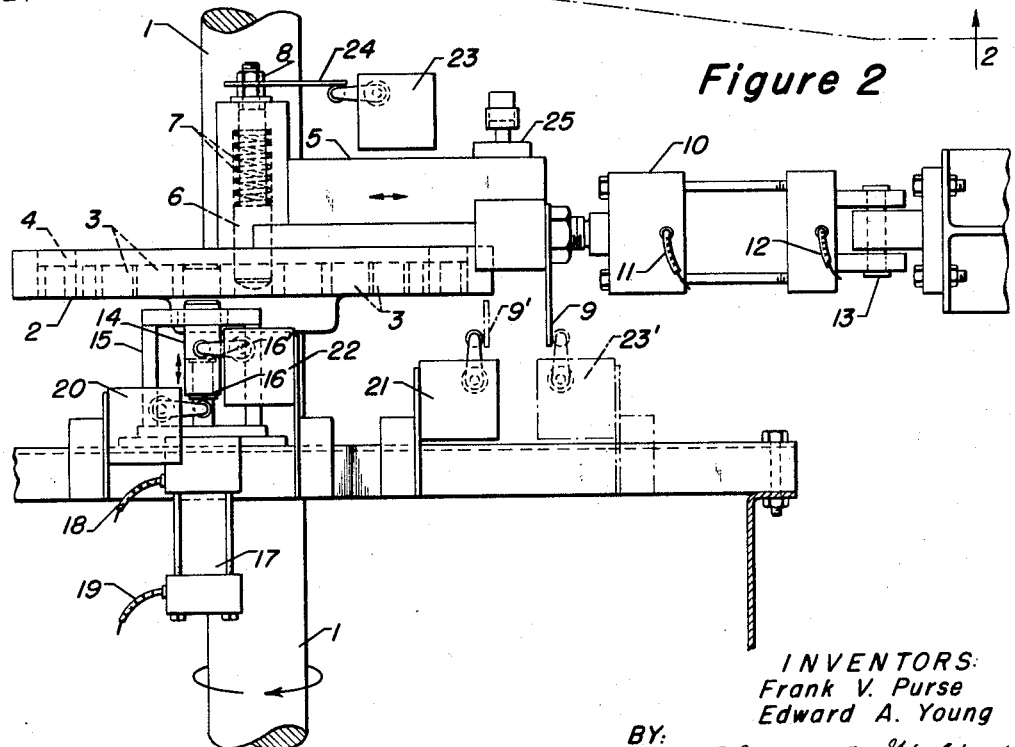
Figure 3A:
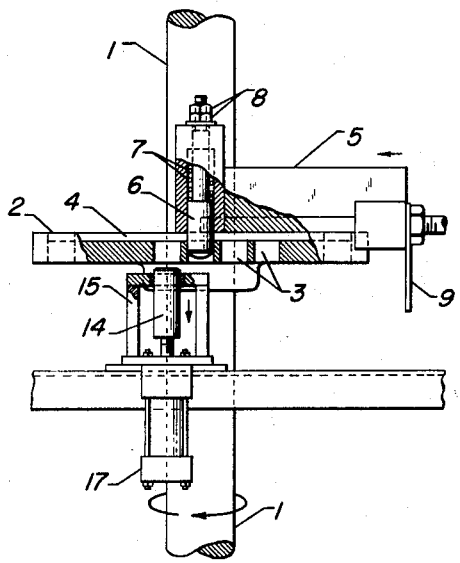
Figure 3B:
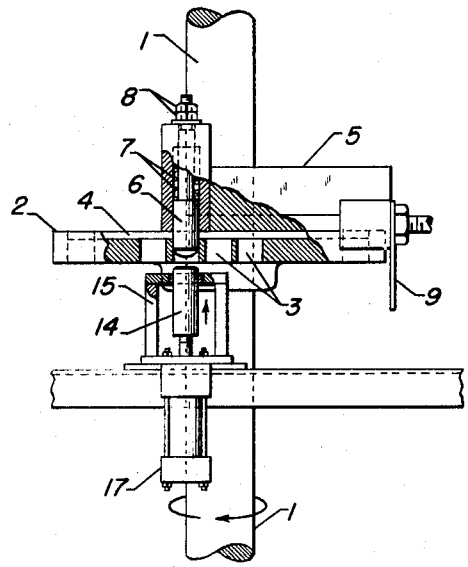
Figure 3C:
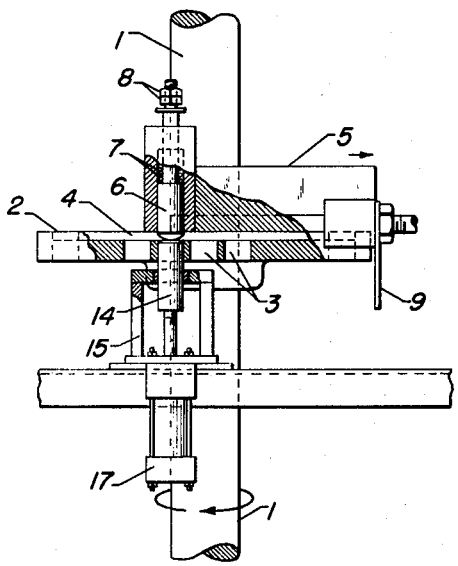
Figure 3D:
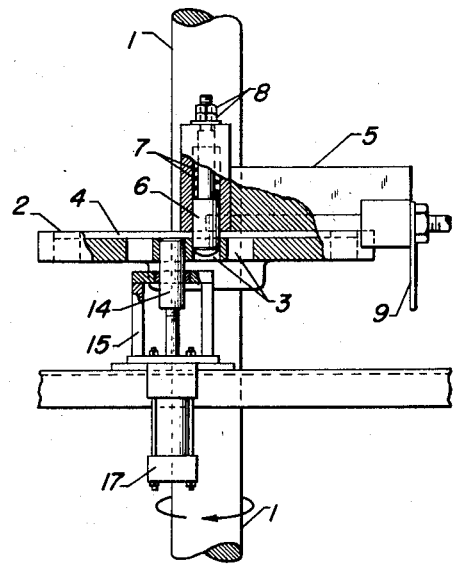
Figure 4:
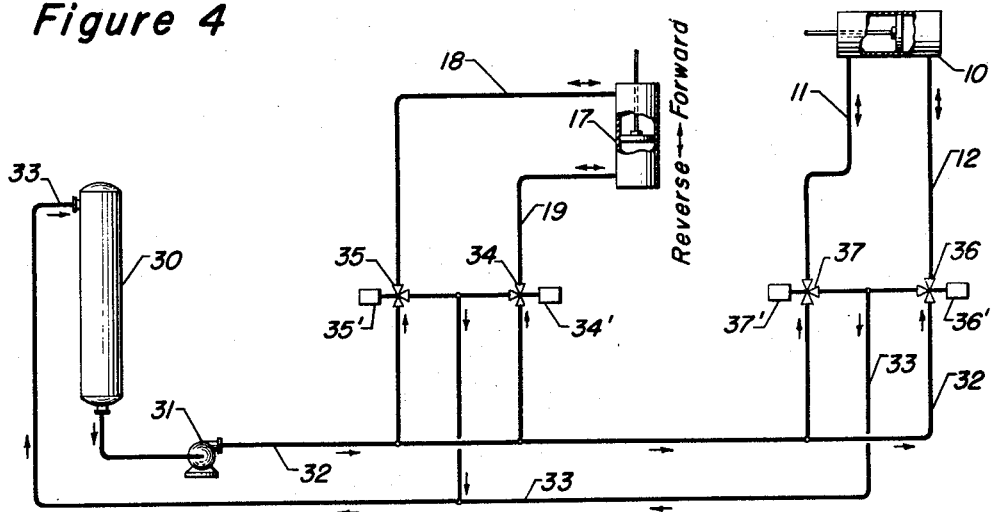
Figure 5:
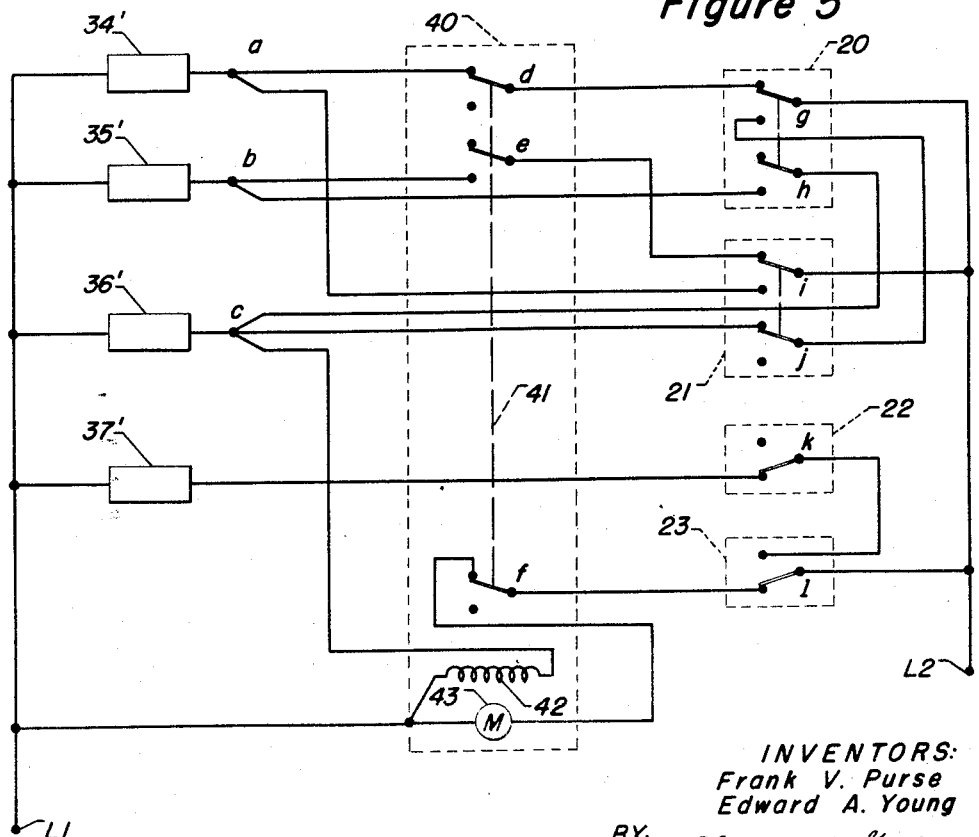

The construction and operation of the rotary drive means may be readily ascertained with reference to the accompanying drawings which are intended to be illustrative rather than limiting upon the broad scope of this invention; various equivalent modifications thereof, which will become apparent to one skilled in the art in the light of the disclosure, may be made without departing from the spirit of this invention. Figures 1 and 2 are, respectively, a plan and elevation view of a specific embodiment of the invention including certain mechanical refinements thereto. Figures 3a, 3b, 3c and 3d illustrate the sequential positions of the various members which comprise the rotary drive means through one cycle of operation. Figure 4 is a flow diagram of a typical hydraulic supply system suitable for actuating the rotary drive mechanism. Figure 5 is a wiring diagram of an electrical sequential control network adapted to provide certain electro-mechanical interlocking and timing functions for the rotary drive mechanism.

Referring first to Figures 1 and 2, a torque-transmitting rotatable shaft 1 extends in a vertical direction and is connected at either end to a driven load, such as the heretofore mentioned rotary distributing valve, which is omitted from the drawing for the sake of clarity. Also omitted are the requisite shaft bearings and the structural support therefor; it is understood that these appurtenances will naturally be supplied by one skilled in the art, and their selection and installation requires no exercise of invention. A horizontal disc or index plate 2 is rigidly attached to shaft 1 by any suitable means such as keying, shrink-fitting, welding and the like, or the shaft and disc may be integrally formed from a single piece of stock. Extending through plate 2 are a number of uniformly spaced holes 3 whose centers lie on a circle concentric to the axis of rotation of shaft 1. Holes 3 are contained within annular depression or track 4 in the upper surface of plate 2, the width of the track being equal to or slightly larger than the diameter of the holes. A reciprocable driving member or drive link 5, operable to undergo an advance stroke and a retraction stroke, moves in the directions indicated in a plane parallel to plate 2 and is actuated by a double-acting hydraulic operator 10, which is attached to suitable trusswork or other supporting means such as pivot joint 13. In Figures 1 and 2, drive link 5 is shown in its retracted position. A shoe bearing 25 bears against the upper surface of the drive link to prevent bending or vertical motion thereof during its advance stroke; the lower end portion of drive link 5 rests upon plate 2 and slides thereon during the advance and retraction strokes. The drive link carries, at its left hand extremity, a movable detent or index pin 6 which is continuously urged, by means of compression spring 7, either into an abutting relationship with plate 2 or into engagement with one of the holes 3 when the pin is moved transversely into axial alignment therewith upon completion of the retraction stroke. Pin 6 is machined to close tolerance so as to be engageable with each of holes 3 with a minimum of free play and otherwise to slide within, and be guided by, track 4. The upper end of pin 6 is provided with lock nuts 8 to restrain the pin from dropping completely through the hole in alignment therewith and to adjust the depth to which the pin 6 is allowed to drop into hole 3. Drive link 5 also carries a tripping arm 9 which is operable to actuate limit switch 21 when the drive link completes its advance stroke, the position of arm 9 then being indicated by the dashed lines designated as 9'. Pin 6 carries another tripping arm 24 which actuates limit switch 23 when the drive link has completed its retraction stroke and pin 6 has dropped into reengagement with the next succeeding hole 3; alternately, limit switch 23 may be installed in the position indicated by dashed outline 23', whereby it may be actuated by arm 9 and thus be made responsive only to completion of the retraction stroke but not to reengagement of pin 6 with hole 3.

A reciprocable locking member or adapted pin 14, operable to reciprocate in a vertical direction and to assume a forward position and a reverse position, is driven by a double-acting hydraulic operator 17. Pin 14 is so located that it lies in axial alignment with each of the holes 3, corresponding to the desired adjusted shaft position, when driving member 5 completes its advance stroke. Pin 14 is adapted to enter the hole 3 in alignment therewith during its forward stroke; upon completion of the forward stroke of the locking member, pin 14 extends completely through the corresponding hole in plate 2 and displaces pin 6 therefrom. A guide member or adapter pilot 15 guides pin 14 during its vertical reciprocating motion and holds it to a predetermined path. Pin 14 carries a tripping arm 16 which actuates limit switch 20 when pin 14 reaches its reverse position, at which point it is completely disengaged from plate 2, and which actuates limit switch 22 when pin 14 reaches its forward position, arm 16 then being in the position indicated by dashed outline 16'. The four limit switches 20, 21, 22 and 23 are electrically interconnected in a manner to be hereinafter described and function to control the alternate movement of the driving member and the locking member.

The operation of the invention may best be described with reference to Figures 3a, 3b, 3c and 3d. Initially, plate 2 has been in a rest or adjusted position for a predetermined length of time as established by automatic timing means hereinbelow described. Upon completion of the timing cycle, locking member 14 is caused to withdraw from the hole 3 into which it has been previously inserted. As shown in Figure 3a, when locking member 14 reaches its reverse position, switch 20 is actuated, initiating the advance stroke of driving member 5 which has previously become insertably engaged with plate 2 through the depressing of pin 6 into the next succeeding hole 3. During the advance stroke of driving member 5, plate 2 is thus rotated through an angle determined by the circumferential spacing of holes 3, and, of course, by the transverse location of limit switch 21. In Figure 3b, driving member 5 has completed its advance stroke, tripped switch 21, and initiated the forward stroke of locking member 14, which is now in axial alignment with the hole containing pin 6. In Figure 3c, when locking member 14 has completely penetrated hole 3 and has displaced pin 6 therefrom, switch 22 is actuated initiating the retraction stroke of driving member 5. Since plate 2 is now rigidly restrained in its new position by locking member 14 and pin 6 is disengaged from the plate, no rotation thereof is possible during the retraction stroke; pin 6 merely slides along the surface of plate 2, being constrained and guided by track 4. In Figure 3d, driving member 5 has finished its retraction stroke, pin 6 has snapped into reengagement with the next succeeding hole 3, and switch 23 has been tripped to reinstitute a new timing cycle. The operating time required to move from the position of Figure 3a to that of Figure 3d is determined by the speed of the hydraulic operators, the stroke lengths of the driving member and the locking member, as well as the response time of the limit switches and the hydraulic supply system. Preferably the various components are so sized that the operating time of the rotary drive mechanism is small in comparison with the rest time, that is, the time interval between the position of Figure 3d and that of Figure 3a, which is established primarily by the amount of time delay interposed by the automatic timing means and may vary from several seconds to several hours depending upon process requirements.

Figure 4 is a simplified flow diagram of a hydraulic control system suitable for actuating the rotary drive mechanism. Double-acting hydraulic operators 10 and 17 actuate, respectively, the driving member and the locking member (not shown in Figure 4). A high pressure hydraulic oil pump 31 takes suction from accumulator 30 and maintains a high pressure supply of oil in supply header 32. Four two-way solenoid valves, numbered 34 to 37 inclusive, and being operated by solenoids 34', 35', 36' and 37' respectively, control the flow of oil to and from their respective operating cylinders. All of the solenoid valves have the same action: when energized, they connect header 32 with conduits 11, 12, 18 or 19 as the case may be; when deenergized, they connect conduits 11, 12, 18 or 19 to low pressure return header 33 which conducts the spent oil back to accumulator 30. During the driving member advance stroke, valve 36 is energized and valve 37 is deenergized, whereby high pressure oil is admitted through conduit 12 into the right-hand chamber of operator 10 and the oil previously contained in the left-hand chamber thereof is discharged at low pressure through conduit 11. For the retraction stroke, valve 36 is deenergized and valve 37 is energized, causing high pressure oil to be introduced through conduit 11 into the left-hand chamber of operator 10, while low pressure oil is discharged from the right-hand chamber thereof via conduit 12. Similarly, in the actuation of operator 17 to perform the forward and reverse strokes thereof, valves 34 and 35 are energized and deenergized in mutual opposition. During the locking member forward stroke, valve 34 is energized and valve 35 is deenergized, whereby high pressure oil flows through conduit 19 into the lower chamber of operator 17 and low pressure oil is forced out of the upper chamber thereof through conduit 18 to low pressure return header 33. For the reverse stroke, valve 34 is deenergized and valve 35 is energized, so that high pressure oil is admitted into the upper chamber of operator 17 via conduit 18 and spent oil is discharged from the lower chamber thereof through conduit 19 to return header 33. In general, a complete hydraulic control system will include various other equipment not shown in Figure 4. Where pump 31 is a gear pump or other positive displacement pump, suitable pressure control means must be provided to control the discharge pressure thereof, such as a pressure relief valve in a spill-back line from pump discharge to suction, or pump speed or stroke adjusting means. Usually the drive link operator 10 will consume much greater power than the adapter operator 17 and hence will require a greater quantity of oil at a higher pressure, so that, in such applications, it is desirable to provide sequential pressure and flow regulating valves which allow automatic selection of high or low delivery pressures in accord with the demand therefor. The pump suction may also be controlled at superatmospheric pressure, for example, by gas blanketing accumulator 30. Various other refinements and modifications which are well known to those skilled in the hydraulic art may be incorporated therein as system requirements dictate. Although the energy source for the rotary drive mechanism has been described in connection with a hydraulic pressure system, it is not necessary to the present invention that it be so restricted; for example, other pressure media such as air or hydrocarbon gases may be employed to power the operating cylinders. It is also within the scope of this invention to use, instead of double-acting hydraulic cylinders, reversible electric motors such as split-series-wound or split-compound-wound motors, which are suitably geared down and connected to the reciprocable driving and locking members by rack-and-pinion means. In the latter case, the forward and reverse series or shunt windings of the reversible motors may be substituted for the solenoid coils of Figure 4.

In establishing the requisite cycle of operation of the present invention, as depicted by the sequence of Figures 3a, 3b, 3c and 3d, the energizing of solenoid coils 34', 35', 36' and 37' is programmed according to the following table where E and D refer respectively to the energized and deenergized condition of the solenoids:

| Action of Hydraulic Operators | Solenoid Coils | | | |
|---|---|---|---|---|
| | 34' | 35' | 36' | 37' |
| Reverse Stroke | D | E | D | D |
| Advance Stroke | D | E | E | D |
| Forward Stroke | E | D | D | D |
| Retraction Stroke | E | D | D | E |
| Rest Position | E | D | D | D |

The energizing of the solenoid coils in the proper sequence is accomplished by means of the aforesaid limit switches 20 to 23 inclusive, the physical locations of which are shown in Figure 1. The switches are arranged to be actuated by the longitudinally moving members and are therefore position-responsive; that is, responsive to completed movement thereof. The limit switches, timing means, and the solenoid coils are interconnected as shown in Figure 5. Switches 20 and 21 comprise double-pole, double-throw contacts; switches 22 and 23 comprise single-pole, double-throw contacts. Timer 40 is of the conventional electrical-reset type manufactured, for example, by the Eagle Signal Corporation and includes a three-pole, double-throw clock-actuated switch 41, reset coil 42, and clock motor 43. The timer reset mechanism requires the application of a voltage pulse across coil 42 to prepare the timer for a new cycle. A suitable operating voltage is impressed across terminals L1 and L2. With reference to Figure 5, any of switches 20 to 23 is considered to be activated when in its lower position and deactivated when in its upper position. The circuit as illustrated is in its timing cycle, corresponding to the rest position of the rotary drive means; switches 22 and 23 are presently activated respectively by the locking member (forward position) and the driving member (retracted position), switches 20 and 21 are presently deactivated, and solenoid coil 34' is energized, the circuit therethrough being L1–34'–a–d–g–L2, while solenoid coils 35', 36' and 37' are open-circuited. Clock motor 43 is energized through path L1–43–f–l–L2. At the end of the timing cycle, timer switch 41 is tripped to its lower position so that coil 34' is deenergized and coil 35' is energized via path L1–35'–b–e–i–L2. Accordingly the locking member undergoes its reverse stroke, whereupon switch 22 is deactivated and, at the completion of the reverse stroke, switch 20 is activated. Coil 35' remains energized through the first-mentioned path L1–35'–b–e–i–L2 and also through a parallel path L1–35'–b–h–c–j–g–L2. Coil 36' is now energized, the circuit therethrough being L1–36'–c–j–g–L2;

concurrently, timer reset coil 42 is energized through path L1–42–c–j–g–L2. Coil 36' having been energized, the driving member commences its advance stroke, deactivating switch 23. At the end of the advance stroke, switch 21 is activated, open-circuiting solenoid coils 35' and 36' and timer reset coil 42, and energizing coil 34' via circuit L1–34'–a–i–L2; upon deenergizing of reset coil 42, switch 41 is tripped to its upper position. Coil 34' having been energized, the locking member begins its forward stroke, whereby switch 20 is deactivated and a parallel circuit through coil 34' is established via path L1–34'–a–d–g–L2. When the forward stroke is completed, switch 22 is activated, energizing coil 37' through path L1–37'–k–l–L2, thereby initiating the driving member retraction stroke. Switch 21 is now deactivated and, at the end of the retraction stroke, switch 23 is activated so that coil 37' is deenergized and the timing cycle is restarted, clock motor 43 now being connected in the circuit L1–43–f–l–L2. At this point the operating cycle is completed and, after a time delay determined by the setting of the particular timer, the cycle will be repeated. If desired, the time delay can be reduced to a minimal amount thereby effecting substantially continuous rotation of the rotary drive mechanism.

From the foregoing description, it is evident that, as between the driving member and the locking member, the movement of either member is contingent upon completed movement of the other member, the motion of both being in alternating relationship. Because of the positive interlocks imposed by the control circuit, it is impossible for both members to move simultaneously or for the locking member to attempt to engage the rotatable member when the detent-containing hole is not in alignment with the locking member, whereby severe structural damage to the apparatus may otherwise be incurred. Furthermore, since the apparatus of this invention must position its load with high precision, the otherwise detrimental effect of inaccurate stroke adjustment of the hydraulic operators in lining up the members is readily overcome by making the movement of each member self-terminating in the manner hereinabove described. When, because of excessive loading, failure of the hydraulic system, or for some other reason, either of the moving members fails to complete its proper stroke, further rotation will cease until the defect is repaired. As an operational safeguard against this contingency, it is frequently desirable to provide a suitable alarm device to alert the plant operating personnel in the event that rotation, once undertaken, remains uncompleted after a predetermined time; this may readily be accomplished, for example, by providing limit switches 22 and 23 each with an auxiliary set of normally-closed contacts connected in parallel, the parallel combination then being connected in series with a time-delay alarm relay. Since switches 22 and 23 are activated simultaneously only during the timing cycle, prolonged deactivation of either would thus actuate the alarm relay.

As a specific example of this invention, a rotary drive mechanism was constructed to accomplish the unidirectional rotation of a 24-port rotary disc valve having 24 adjusted positions. Referring again to Figure 1, shaft 1 was 3½" in diameter, 50⅝" long, and was supported at its upper and lower portions by suitable flange bearings. The uppermost end of shaft 1 was connected to the valve shaft through a flexible splined coupling. Index plate 2 was 17" in diameter, 1⅝" thick and was keyed to shaft 1 approximately at the midpoint thereof. Circular track 4 was machined to a depth of ½" and a width of 1.502". Twenty-four holes 3, each 1.500" in diameter, were drilled through the track at 15° intervals. The holes and the track were centered on a circle 14" in diameter. Drive link 5 was fashioned from a modified T-section of ¾" plate approximately 10½" long, 5¼" high, and 2½" wide. Index pin 6 was 8¼" in overall length, the hole-engaging portion thereof being 2⅞" long and 1.495" in diameter. Adapter 14 was 3⅜" long and 1.490" in diameter. Hydraulic operator 10 was provided with a bore of 3¼" and a stroke of about 1.83", operator 17 with a bore of 1½" and a stroke of about 1.38", and both operators were designed for a maximum oil pressure of 2000 p.s.i., although a reduced pressure of from about 50 to about 200 p.s.i. was found to be more than ample for operator 17. The above apparatus was capable of rotating the disc valve, which had a frictional counter-torque of 28,700 in.-lbs., through an angle of 15° in 0.6 second; the corresponding advance stroke of the driving member was 1.827", and the overall displacement error did not exceed 2.5 minutes of arc. The total operating time, commencing with initiation of the locking member reverse stroke and ending with completion of the driving member retraction stroke, was 2.3 seconds.

The instant apparatus may be modified in various ways without exceeding the scope of the invention. Although the plane of rotation of the particular embodiment illustrated in Figures 1 and 2 is horizontal, it is obvious that the plane of rotation may be oblique, vertical or completely inverted, as the specific installation warrants. It is not necessary that rotatable member 2 be in the form of a circular disc, but may be square, oval or any shape of any suitable thickness provided, however, that holes 3 therein are uniformly spaced on a circle which is centered on the axis of rotation and that the depth of the holes is substantially uniform. While the holes are shown extending perpendicular to the plane of rotation, they may, if it is so desired, extend at an angle thereto, subject, however, to the condition that pin 6 and adapter 14 be adapted to move in axial alignment with the holes. Track 4 is provided to serve as the detent guiding means to constrain detent 6 to a predetermined path during the retraction stroke, thereby insuring its reengagement with the next succeeding hole; instead of a depressed track, the detent guiding means may consist in dual, circular, parallel ridges formed in the upper surface of plate 2, which ridges would then serve also as a bearing surface for driving member 5.

In view of the foregoing it is evident that the rotary drive mechanism of this invention provides a relatively simple but effective means for rotating, step-wise and unidirectionally, a highly frictional load with a high degree of precision, while avoiding those defects presently associated with conventional ratchet-and-pawl or rack-and-pinion devices.

We claim as our invention:

1. In a rotary drive mechanism, a rotatable member, a reciprocable driving member, a disengageable connection means carried by said driving member connecting the latter with said rotatable member whereby said driving member in one direction of movement thereof is pivotally engaged with the rotatable member for effecting rotation of the latter through a predetermined angle and in the other direction of movement thereof is disengaged from the rotatable member, a reciprocable locking member positioned adjacent said rotatable member, said locking member in one of its extended positions engaging with and restraining the rotatable member from movement while disengaging said connection means from said rotatable member and in the other of its extended positions being disengaged from said rotatable member and permitting unimpeded rotation of the latter, and interlocking control means connecting with both said driving member and said locking member and actuating the alternate movement of said members.

2. A rotary drive mechanism comprising in combination a rotatable member, a reciprocable driving member undergoing an advance stroke and a retraction stroke, a disengageable connection means carried by said driving member and insertably engaging the rotatable member upon completion of said retraction stroke and during said advance stroke whereby rotation of the latter through a predetermined angle is effected, said connection means being disengaged from said rotatable member prior to and during said retraction stroke, a reciprocable locking member positioned adjacent said rotatable member and attaining forward and reverse positions, said locking member in its forward position insertably engaging with and restraining said rotatable member from movement while disengaging said connection means from said rotatable member, said locking member in its reverse position being disengaged from said rotatable member and permitting unimpeded rotation of the latter, first control means responsive to attainment of said reverse position and initiating said advance stroke, second control means responsive to completion of said advance stroke and initiating movement of said locking member toward its forward position, third control means responsive to attainment of said forward position and initiating said retraction stroke, and fourth control means responsive to completion of said retraction stroke and initiating movement of said locking member toward its reverse position.

3. The apparatus of claim 2 further characterized in that said fourth control means is responsive conjunctively to completion of said retraction stroke and to engagement of said connection means with said rotatable member.

4. The apparatus of claim 2 further characterized in that said fourth control means comprises time-delay means whereby initiation of movement of said locking member toward its reverse position is delayed in time with respect to completion of said retraction stroke in excess of the time interval between initiation of movement of said locking member toward its reverse position and completion of said retraction stroke.

5. In a rotary drive mechanism for effecting incremental, unidirectional rotation of a shaft, the combination of a plate affixed to the shaft, a plurality of uniformly spaced perforations extending through said plate and circumferentially disposed around said shaft, a reciprocable driving member undergoing an advance stroke and a retraction stroke in a plane parallel to said plate, a moveable detent carried by the driving member and successively engaging said plate through one end of each of said perforations upon completion of said retraction stroke and during said advance stroke and being disengaged from said plate during said retraction stroke, a reciprocable locking member positioned adjacent said plate and disposed in axial alignment with the perforation engaged by said detent when said driving member completes its advance stroke, said locking member successively engaging said plate through the other end of the same perforation in alignment therewith whereby said detent is disengaged from said plate, said locking member connectable with said plate to prevent rotation thereof during said retraction stroke and disengaging the plate prior to said advance stroke, and interlocking control means connecting with both said driving member and said locking member and actuating the alternate movement of said members, the movement of one conditioned upon completion of the movement of the other.

6. In a rotary drive mechanism for effecting incremental, unidirectional rotation of a shaft, the combination of a plate affixed to the shaft, a plurality of uniformly spaced perforations extending through said plate and circumferentially disposed around said shaft, a reciprocable driving member undergoing an advance stroke and a retraction stroke in a plane parallel to said plate, a moveable detent carried by the driving member and successively engaging said plate through one end of each of said perforations upon completion of said retraction stroke and during said advance stroke and being disengaged from said plate but maintained in abutting relationship therewith during said retraction stroke, a reciprocable locking member positioned adjacent said plate and disposed in axial alignment with the perforation engaged by said detent when said driving member completes its advance stroke, said locking member successively engaging said plate through the other end of the same perforation in alignment therewith whereby said detent is disengaged from said plate, said locking member connectable with said plate to prevent rotation thereof during said retraction stroke and disengaging the plate prior to said advance stroke, and interlocking control means connecting with both said driving member and said locking member and actuating the alternate movement of said members, the movement of one conditioned upon completion of the movement of the other.

7. The apparatus of claim 6 further characterized in that said plate comprises detent guiding means adapted to constrain said detent to a predetermined path relative to the plate during said retraction stroke.

References Cited in the file of this patent

UNITED STATES PATENTS

| 646,287 | Hundhausen | Mar. 27, 1900 |
| 2,660,895 | Waters | Dec. 1, 1953 |